Figure 1:
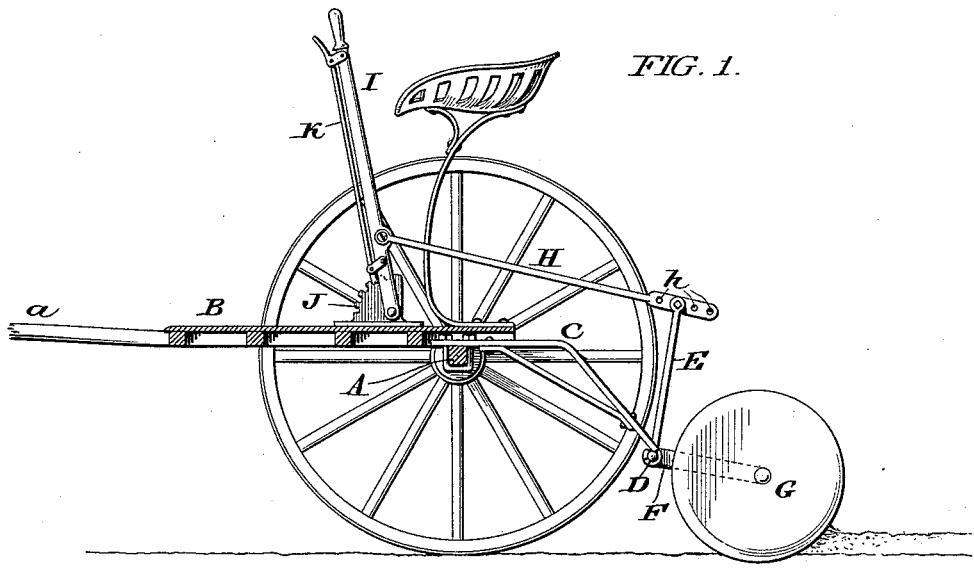

(No Model.)

J. LUNDY.
POTATO COVERER.

No. 486,534. Patented Nov. 22, 1892.

WITNESSES:
F. Norman Dixon
G. W. Walters

INVENTOR:
Joseph Lundy
By his Attorneys
Strawbridge & Taylor

UNITED STATES PATENT OFFICE.

JOSEPH LUNDY, OF RANCOCAS, NEW JERSEY.

POTATO-COVERER.

SPECIFICATION forming part of Letters Patent No. 486,534, dated November 22, 1892.

Application filed May 25, 1891. Serial No. 394,091. (No model.)

*To all whom it may concern:*

Be it known that I, JOSEPH LUNDY, a citizen of the United States, residing at Rancocas, New Jersey, have invented an Improvement in Machines for Hilling Potatoes and other Vegetables, of which the following is a specification.

My invention relates to a class of devices which being mounted upon any suitable traveling support, are adapted to sweep the adjacent underlying earth into a continuous ridge or elongated mound, and which devices are most commonly employed in connection with the planting of potatoes, being carried along in such relation to potatoes placed on the surface of the ground that the ridge formed by the device covers or "hills" the same. The machine is of course applicable to other agricultural purposes. In these machines as heretofore constructed a framework mounted upon wheels supports a pair of disks placed a suitable distance apart, not however, set in parallel planes, but in such angular relationship to each other that the rear portions of the two are closer together than the front portions, and which disks are pressed by the weight of the machine into the ground for such predetermined distance as will cause them to act upon or impinge against a sufficient depth or quantity to form a ridge of the required area.

It is the object of my invention to construct a machine of the foregoing character in which the disks shall be so mounted and applied that their vertical adjustment either to vary the depth to which in operation they enter the ground, or to lift them above the surface of the ground in the transportation of the machine to and from the field of operation, and in passing over obstructions, may be easily and expeditiously effected.

In the drawings I illustrate and herein I describe a preferred form of a convenient embodiment of my invention, the particular subject matter claimed as novel being hereinafter definitely specified.

Figure 2:
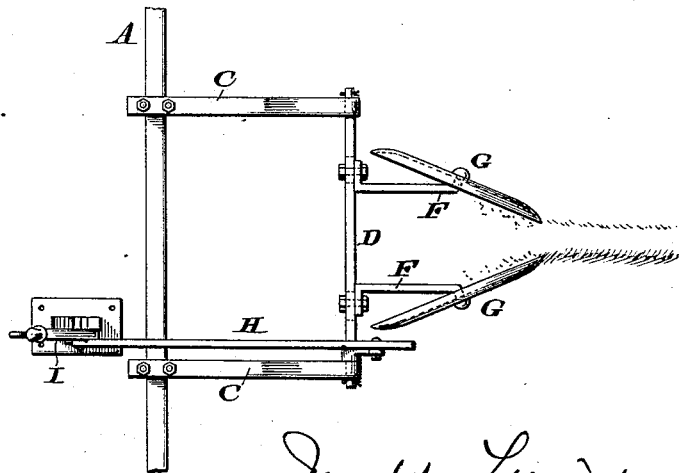

In the accompanying drawings, Figure 1 is a view in side elevation of my improved potato hiller, the road or supporting wheel nearest the eye being removed to exhibit the construction and arrangement of the parts. Fig. 2 is a top plan view of the operative parts of my apparatus, removed from the traveling support.

In the drawings, a pair of road or driving wheels connected to a shaft or axle A, supporting a platform B, upon which is erected a seat, constitute a vehicle which is hereinafter referred to as the traveling support. Any form of traveling support may be employed, and it may also, of course be utilized to carry additional devices for performing other functions than the hilling of potatoes.

C, C, are a pair of arms which are by U-bolts or other suitable devices rigidly secured at a suitable distance apart to the axle A, or other portion of the traveling support, and the bodies of which, extending rearwardly and downwardly, terminate at a point somewhat to the rear of the driving wheels and quite close to the ground.

D is a rock shaft, the respective extremities of which are entered, free for rotative oscillation, in eyes formed in the respective lower extremities of the arms C.

E is a rocker arm, rigidly secured to and extending upwardly from said rock shaft,—and F F are a pair of disk bars rigidly secured to and extending rearwardly from said rock shaft.

G G are disks each mounted at the free extremity of one of the arms F and free for the idle rotation induced by their contact with the ground.

It will now be understood that the arms C C form a rigid framework upheld by the traveling support, in which framework the rock shaft D is journaled for rotative movement. It will also be understood that the rocker arm E, constitutes in effect one arm,— and the disk bars the other arm,—of a bell crank lever of which the rock shaft constitutes the fulcrum, and that the throw of the rocker arm in one or the other direction will occasion the elevation or depression of the disks.

A convenient mechanism by which the driver may from his seat conveniently effect either the desired movement of the disks, or their locking in a desired adjusted position, is as follows: H is a link one extremity of which is hingedly connected to the upper extremity of the arm E and the other extremity connected to a vertical hand lever I, the upper extremity of which latter is fashioned into a manipulating handle, while its lower extremity is secured to a ratchet sector J secured to the traveling support in the vicinity of the driver's seat. The lever I is conveniently provided with an ordinary operating latch K which by engagement with the sector in the usual manner, locks the lever with respect thereto. The rear end of the link H is provided with a series of holes $h$ by virtue of which it may be lengthened or shortened with respect to its attachment to the arm E. As will be understood the movement of the lever I forward or backward will through the link H tilt the arm E, occasion the rotative movement of the rock shaft, and the elevation or depression of the disks. By this means the driver may without dismounting quickly and easily throw the disks into and out of operation, regulate their depth of penetration, and, through the latch and ratchet sector, lock the disks in various positions of adjustment.

Having thus described my invention, I claim and desire to secure by Letters Patent:

1. In combination, the traveling support, the disk arms, disks mounted on said arms, the rock arm connected rigidly with the disk arms, and means for positively throwing the rock arm in either direction, substantially as set forth.

2. In combination, the traveling support, the rock shaft, disk arms mounted on said rock shaft, disks mounted on said arms, a rock arm connected to said shaft, and means for positively throwing said rock arm in either direction, substantially as set forth.

3. In combination, the traveling support, the rock shaft, the disk-provided arms mounted on said rock shaft, a rock arm connected to said shaft, the lever, and a rigid link the respective extremities of which are positively coupled to the rock arm and the lever respectively, substantially as set forth.

4. In combination, the traveling support, the rock shaft, the disk-provided arms mounted on said rock shaft, a rock arm connected to said shaft, a lever, means for locking the lever in given positions of adjustment, and a rigid link, the respective extremities of which are coupled positively to the rock arm and lever respectively, substantially as set forth.

JOSEPH LUNDY.

Witnesses:
DANIEL B. SMITH,
JOHN B. COLLINS.